United States Patent
Alonso Franco et al.

(10) Patent No.: US 10,511,512 B2
(45) Date of Patent: Dec. 17, 2019

(54) DYNAMIC CONTENT FILTERING OF DATA TRAFFIC IN A COMMUNICATION NETWORK

(75) Inventors: Esperanza Alonso Franco, Madrid (ES); Miguel Angel Muñoz De La Torre Alonso, Madrid (ES)

(73) Assignee: Telefonaktiebolaget LM Ericsson (Publ) (SE)

( * ) Notice: Subject to any disclaimer, the term of this patent is extended or adjusted under 35 U.S.C. 154(b) by 123 days.

(21) Appl. No.: 14/417,742

(22) PCT Filed: Aug. 6, 2012

(86) PCT No.: PCT/EP2012/065347
§ 371 (c)(1),
(2), (4) Date: Jan. 27, 2015

(87) PCT Pub. No.: WO2014/023327
PCT Pub. Date: Feb. 13, 2014

(65) Prior Publication Data
US 2015/0215186 A1     Jul. 30, 2015

(51) Int. Cl.
*G06F 15/173* (2006.01)
*H04L 12/26* (2006.01)
(Continued)

(52) U.S. Cl.
CPC .......... *H04L 43/10* (2013.01); *H04L 63/0245* (2013.01); *H04L 63/102* (2013.01);
(Continued)

(58) Field of Classification Search
CPC ....... H04L 43/10; H04L 63/102; H04L 63/20; H04L 67/322; H04L 63/0245; H04W 12/08
(Continued)

(56) References Cited

U.S. PATENT DOCUMENTS

| 8,086,678 | B2 * | 12/2011 | Heredia | G06F 15/16 709/206 |
| 8,131,831 | B1 * | 3/2012 | Hu | H04M 15/43 379/201.03 |

(Continued)

FOREIGN PATENT DOCUMENTS

| WO | 2010049002 A1 | 5/2010 |
| WO | 20110026523 A1 | 3/2011 |

(Continued)

OTHER PUBLICATIONS

NPL1_International Search Report and Written Opinion dated Apr. 25, 2013 for International Application No. PCT/EP2012/065347, International Filing Date—Aug. 6, 2012 consisting of 13-pages.
(Continued)

*Primary Examiner* — Krisna Lim
(74) *Attorney, Agent, or Firm* — Christopher & Weisberg, P.A.

(57) ABSTRACT

For differentiating data traffic in a communication network, a policy controller may interact with at least one node of the communication network. The policy controller may determine an identifier of a subscriber associated with a user equipment connected to the communication network. The policy controller may perform, on the basis of a location of the user equipment and/or on the basis of a time schedule, a selection between at least a first set of one or more content filtering rules and a second set of content filtering rules related to the identifier of the subscriber. The policy controller may indicate a result of the selection to the at least one node. The node may perform content filtering of data traffic of the user equipment. For this purpose, the at least one node may utilize the selected set of one or more content filtering rules as indicated by the policy controller.

20 Claims, 10 Drawing Sheets

| | CF POLICY | |
|---|---|---|
| | ALLOW | BLOCK |
| CF IDENTIFIER 1 | WEATHER, INFANTS | ADVERTISEMENT, ADULT, VIOLENCE, NEWS |
| CF IDENTIFIER 2 | ALL CONTENT | NOTHING |
| CF IDENTIFIER 3 | WEATHER, NEWS, ADVERTISEMENT | ADULT, VIOLENCE |

(51) Int. Cl.
*H04W 12/08* (2009.01)
*H04L 29/06* (2006.01)
*H04L 29/08* (2006.01)

(52) U.S. Cl.
CPC ............ *H04L 63/20* (2013.01); *H04L 67/322* (2013.01); *H04W 12/08* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 8,353,000 | B2* | 1/2013 | He ........................ | H04L 63/20 455/406 |
| 8,527,504 | B1* | 9/2013 | Krishnamurthy ...... | G06Q 30/02 707/722 |
| 8,813,168 | B2* | 8/2014 | Riley .................... | H04M 15/00 726/1 |
| 2006/0047634 | A1* | 3/2006 | Aaron ................. | G06F 16/9535 |
| 2006/0080439 | A1* | 4/2006 | Chud .................... | H04L 63/104 709/225 |
| 2008/0155118 | A1* | 6/2008 | Glaser ..................... | H04W 4/02 709/238 |
| 2010/0150156 | A1* | 6/2010 | Diwan ................. | H04L 12/1859 370/390 |
| 2010/0241745 | A1* | 9/2010 | Offen ................. | G06Q 30/0251 709/224 |
| 2010/0262472 | A1* | 10/2010 | Gautam ................. | G06Q 30/02 705/14.1 |
| 2011/0092221 | A1* | 4/2011 | Zubas ............... | H04M 1/72547 455/456.1 |
| 2011/0208853 | A1* | 8/2011 | Castro-Castro ......... | H04L 12/14 709/223 |
| 2011/0225280 | A1* | 9/2011 | Delsesto ........... | H04L 29/12896 709/223 |
| 2011/0225281 | A1* | 9/2011 | Riley ...................... | H04L 12/14 709/223 |
| 2011/0225309 | A1* | 9/2011 | Riley ...................... | H04L 47/10 709/228 |
| 2011/0264804 | A1* | 10/2011 | Vuksan ............... | G06F 16/9535 709/225 |
| 2011/0317558 | A1 | 12/2011 | Siddam et al. | |
| 2012/0023246 | A1* | 1/2012 | Castro Castro ..... | H04L 41/0893 709/229 |
| 2012/0144049 | A1* | 6/2012 | Lopez Nieto ........... | H04L 12/14 709/228 |
| 2012/0173582 | A1* | 7/2012 | Stevens ............... | G06F 21/6218 707/782 |
| 2012/0281540 | A1* | 11/2012 | Khan .................... | H04L 45/308 370/241 |
| 2012/0290452 | A1* | 11/2012 | Pancorbo Marcos ........................ | H04L 12/1407 705/30 |
| 2015/0296478 | A1* | 10/2015 | Rasanen ............... | H04L 65/104 455/456.1 |
| 2015/0312801 | A1* | 10/2015 | Khan .................... | H04L 45/308 370/235 |

FOREIGN PATENT DOCUMENTS

| | | | |
|---|---|---|---|
| WO | WO 201303037421 | * | 3/2013 |
| WO | WO-2014023327 A1 | * | 2/2014 |

OTHER PUBLICATIONS

NPL2_J. Elson, et al.—Network Working Group (Request for Comments (RFC) 3507), Title: "Internet Content Adaptation Protocol (ICAP)", (Apr. 2003) Category: Informational, consisting of 49-pages.
NPL3_3GPP TS 23.203 V11.5.0 (Mar. 2012), "3rd Generation Partnership Project; Technical Specification Group Services and System Aspects; Policy and Charging Control Architecture; (Release 11)" consisting of 175 pages.
NPL4_3GPP TS 29.212 V11.4.0 (Mar. 2012), "3rd Generation Partnership Project; Technical Specification Group Core Network and Terminals; Policy and Charging Control (PCC) over Gx/Sd reference point; (Release 11)" consisting of 181 pages.
Indian Examination Report dated Dec. 7, 2018 for Application No. 11230/DELNP/2014, consisting of 6-pages.

* cited by examiner

| STATIC CF GROUP | DYNAMIC CF GROUP | | | |
|---|---|---|---|---|
| | | LOCATION A | LOCATION B | LOCATION C |
| SUBSCRIBER TYPE 1 | TIMESLOT 1 | GROUP 1-1.1 | GROUP 1-1.2 | GROUP 1-1.3 |
| | TIMESLOT 2 | GROUP 1-2.1 | GROUP 1-2.2 | GROUP 1-2.3 |
| SUBSCRIBER TYPE 2 | TIMESLOT 1 | GROUP 2-1.1 | GROUP 2-1.2 | GROUP 2-1.3 |
| | TIMESLOT 2 | GROUP 2-2.1 | GROUP 2-2.2 | GROUP 2-2.3 |
| SUBSCRIBER TYPE 3 | TIMESLOT 1 | GROUP 3-1.1 | GROUP 3-1.2 | GROUP 3-1.3 |
| | TIMESLOT 2 | GROUP 3-2.1 | GROUP 3-2.2 | GROUP 3-2.3 |

FIG. 2

```
REQMOD icap://icap-server.net/server?arg=87 ICAP/1.0
Host: icap-server.net
Encapsulated: req-hdr=0, null-body=170
Group-Identifier: "Group 1-2.1"

GET / HTTP/1.1
Host: www.contentserver.com
Accept: text/html, text/plain
Accept-Encoding: compress
```

FIG. 5

| | CF POLICY | |
|---|---|---|
| | ALLOW | BLOCK |
| CF IDENTIFIER 1 | WEATHER, INFANTS | ADVERTISEMENT, ADULT, VIOLENCE, NEWS |
| CF IDENTIFIER 2 | ALL CONTENT | NOTHING |
| CF IDENTIFIER 3 | WEATHER, NEWS, ADVERTISEMENT | ADULT, VIOLENCE |

FIG. 6

DYNAMIC CONTENT FILTERING OF DATA TRAFFIC IN A COMMUNICATION NETWORK

TECHNICAL FIELD

The present invention relates to methods for differentiating data traffic in a communication network and to corresponding devices.

BACKGROUND

In communication networks, it is known to utilize policy control functionalities for differentiating data traffic of a user, e.g., with respect to charging or Quality of Service (QoS).

For example, for mobile networks according of the 3$^{rd}$ Generation Partnership Project (3GPP), 3GPP Technical Specification (TS) 23.203 discloses a Policy and Charging Control (PCC) architecture for the Evolved 3GPP Packet System (EPS). This PCC architecture allows for example determining and subsequently enforcing policies for data flows relating to services involving a user equipment (UE) attached to the mobile network. These policies typically relate to charging or QoS. Also, it is possible to selectively authorize certain services or applications.

In this PCC architecture, a policy controller referred to as Policy and Charging Rules Function (PCRF) is utilized for making policy decisions with respect to services requested by the user of an UE. These policy decisions are then enforced by an entity referred to as Policy and Charging Enforcement Function (PCEF). Other nodes subject to policy control by the PCRF are entities referred to as Traffic Detection Function (TDF). Both the PCEF and the TDF are involved in routing signaling and/or media relating to said services. In this PCC architecture, the PCRF behaves as a Policy Decision Point (PDP) or policy server and for example stores user policies and determines which ones are to be applied. Nodes implementing PCEF and/or TDF functionalities actually route data flows to or from end users and behave as Policy Enforcing Points (PEP)s of the policies determined by the PCRF. A PCEF or TDF may for example be located in a gateway routing the data traffic.

The policy decisions made by the PCRF are transmitted, e.g., via interfaces referred to as Gx or Sd, to the PEPs that are involved in routing data flows conveying media and/or signaling of a service of a UE, e.g., in the form of PCC rules. Also, the PCRF can transmit to said policy enforcing point/s rules for detecting, policing and reporting usage by said UE of certain services; e.g., in the form of Application Detection and Control (ADC) rules.

Accordingly, the PCC architecture of 3GPP TS 23.203 allows for establishing policies with respect to data flow(s) relating to a service originated or terminated by an UE. These policies may be based on the specific service invoked or terminated by the UE, e.g., an Internet Protocol Multimedia System (IMS) session or a Hypertext Transfer Protocol (HTTP) web browsing session. The policies may also be based on a subscriber profile of the user.

However, the PCC architecture of 3GPP does not support differentiation between different types of content, e.g., to distinguish between different types of media content delivered by the same service.

A known concept for distinguishing between different types of content is referred to as content filtering, which is not merely based on the kind of accessed service as such, e.g., whether it is a HTTP based service or an IMS based service, nor merely on a network identifier of the server providing the service, e.g., Uniform Resource Locator (URL) of destination or origination, Internet Protocol (IP) address, or Transport Control Protocol (TCP) port. Rather, content filtering utilizes information about a content type or category, e.g., whether the content corresponds to an advertisement information type, adult information type, audio or video information type, certain file types, or the like. Such different content types or categories can be delivered within the same service. However, such content filtering techniques are not supported by known policy control architectures, e.g., the PCC architecture of 3GPP TS 23.203.

Accordingly, there is a need for techniques which allow for efficiently differentiating data traffic with a high degree of granularity, in particular on a content level.

SUMMARY

According to an embodiment of the invention, a method of differentiating data traffic in a communication network is provided. According to the method, a policy controller of the communication network determines an identifier of a subscriber associated with a user equipment connected to the communication network. On the basis of a location of the user equipment and/or a time schedule, the policy controller performs a selection between at least a first set of one or more content filtering rules and a second set of one or more content filtering rules related to the identifier of the subscriber. The policy controller indicates a result of the selection to at least one node of the communication network. The node is configured to perform, on the basis of the selected set of one or more content filtering rules, content filtering of data traffic of the user equipment.

According to a further embodiment of the invention, a method of differentiating data traffic in a communication network is provided. According to the method, a node of the communication network receives, from a policy controller, an indication of a result of a selection between at least a first set of one or more content filtering rules and a second set of one or more content filtering rules related to an identifier of a subscriber of a user equipment connected to the communication network. The selection is based on a location of the user equipment and/or a time schedule. On the basis of the selected set of one or more content filtering rules, the node performs content filtering of data traffic of the user equipment.

According to a further embodiment of the invention, a policy controller for a communication network is provided. The policy controller comprises a processor. The processor is configured to determine an identifier of a subscriber associated with a user equipment connected to the communication network. Further, the processor is configured to perform, on the basis of a location of the user equipment and/or on the basis of a time schedule, a selection between at least a first set of one or more content filtering rules and a second set of one or more content filtering rules related to the identifier of the subscriber. The policy controller further comprises an interface for indicating a result of the selection to at least one node of the communication network. The node is configured to perform, on the basis of the selected set of one or more content filtering rules, content filtering of data traffic of the user equipment.

According to a further embodiment of the invention, a node for a communication network is provided. The node comprises an interface for receiving, from a policy controller, an indication of a result of a selection between at least a first set of one or more content filtering rules and a second set of one or more content filtering rules related to an identifier of a subscriber associated with a user equipment. The selection is based on a location of the user equipment and/or a time schedule. The node further comprises a processor. The processor is configured to perform, on the basis of the selected set of one or more content filtering rules, content filtering of data traffic of the user equipment.

According to a further embodiment of the invention, a system for differentiating data traffic in a communication network is provided. The system comprises a policy controller and at least one node. The policy controller is configured to determine an identifier of a subscriber associated with a user equipment connected to the communication network, to perform, on the basis of a location of the user equipment and/or on the basis of a time schedule, a selection between at least a first set of one or more content filtering rules and a second set of content filtering rules related to the identifier of the subscriber, and to indicate a result of the selection to the node. The node is configured to perform, on the basis of the selected set of one or more content filtering rules, content filtering of data traffic of the user equipment.

According to a further embodiment of the invention, a computer program product is provided. The computer program product comprises computer readable program code that, when executed by a processor of a policy controller of a communication network, causes the policy controller to carry out the steps of a method comprising:
  determining an identifier of a subscriber associated with a user equipment connected to the communication network,
  on the basis of a location of the user equipment and/or a time schedule, performing a selection between at least a first set of one or more content filtering rules and a second set of one or more content filtering rules related to the identifier of the subscriber, and
  indicating a result of the selection to at least one node of the communication network, the node being configured to perform, on the basis of the selected set of one or more content filtering rules, content filtering of data traffic of the user equipment.

According to a further embodiment of the invention, a computer program product is provided. The computer program product comprises computer readable program code that, when executed by a processor of a node of a communication network, causes the node to carry out the steps of a method comprising:
  receiving, from a policy controller, an indication of a result of a selection between at least a first set of one or more content filtering rules and a second set of one or more content filtering rules related to an identifier of a subscriber associated with a user equipment connected to the communication network, the selection being based on a location of the user equipment and/or a time schedule, and
  on the basis of the selected set of one or more content filtering rules, performing content filtering of data traffic of the user equipment.

BRIEF DESCRIPTION OF THE DRAWINGS

FIG. 2 shows an example of a mapping scheme for content filtering identifiers as used in an embodiment of the invention.
FIG. 5 shows an example of a request to a content filtering policy server as used in an embodiment of the invention.
FIG. 6 shows an example of determining content filtering policies as used in an embodiment of the invention.

DETAILED DESCRIPTION OF EMBODIMENTS

In the following, the invention will be explained in more detail by referring to exemplary embodiments and to the accompanying drawings. The illustrated embodiments relate to concepts of differentiating data traffic in a communication network, e.g., a mobile network according to the 3GPP TSs. However, it is to be understood that the illustrated concepts may be applied in other types of communication network as well. The concepts in particular have the purpose of content-level differentiation in the data traffic of a UE. Using these concepts, one ore more content filtering (CF) rules to be applied to the data flows of an UE can be dynamically determined.

Figure 1:
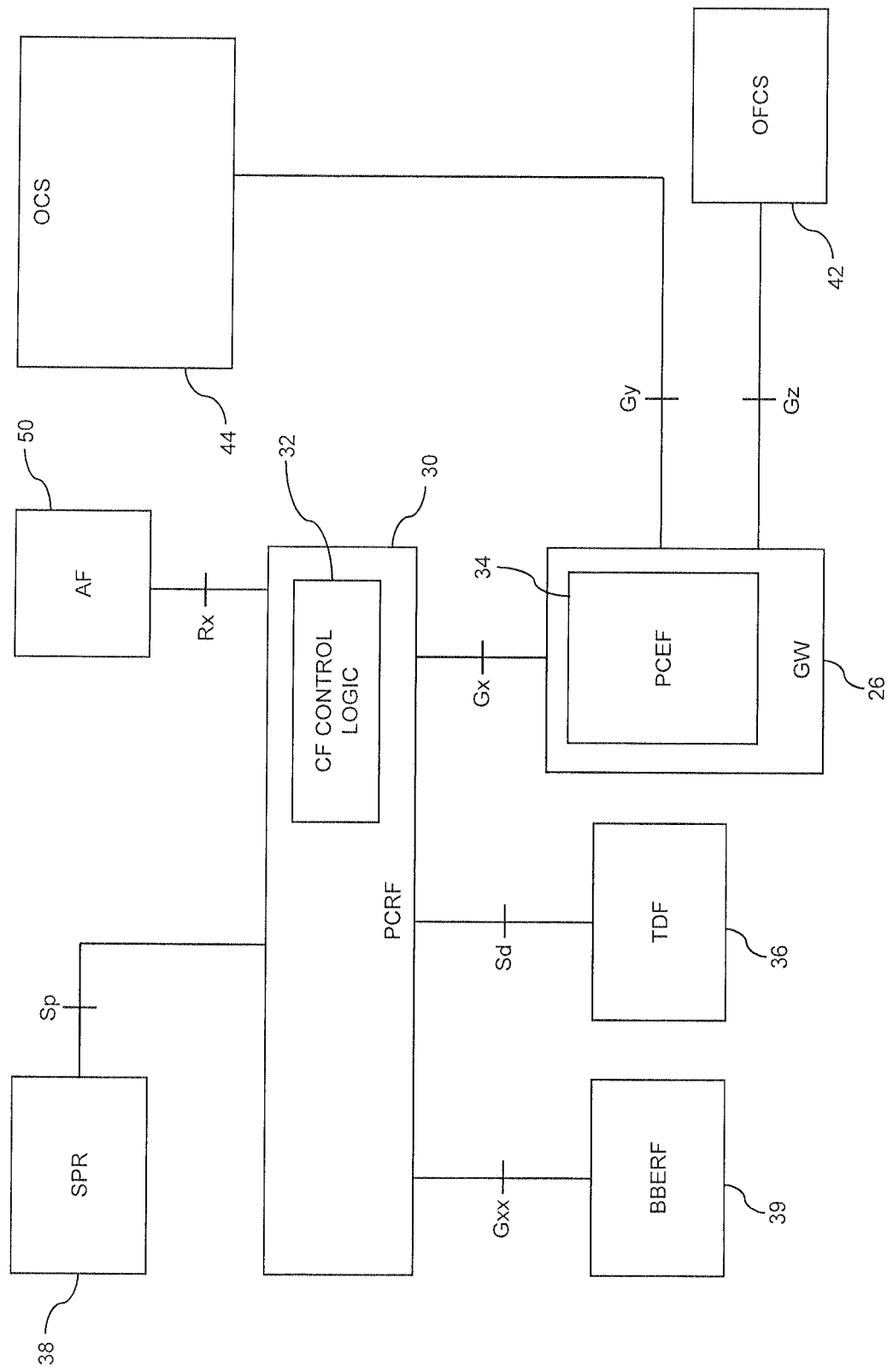
FIG. 1 schematically illustrates a PCC architecture according to an embodiment of the invention.

FIG. 1 illustrates implementation of the concepts in a mobile network using a PCC architecture according to 3GPP TS 23.203. As illustrated, the PCC architecture includes a gateway (GW) 26 for providing a packet data connection to a UE (not illustrated in FIG. 1), an AF 50, and a policy controller in the form of a PCRF 30. The PCRF 30 is equipped with a CF control logic 32. The gateway may for example be a Packet Data Network Gateway (PDN-GW) or a General Packet Radio Service Gateway Support Node (GGSN).

As further illustrated, the PCC architecture also includes a repository 38 and a Policy Control Enforcement Function (PCEF) 34. In the illustrated example, the repository 38 corresponds to a Subscriber Profile Repository (SPR). However, it is to be understood that other types of repository could be used as well, e.g., a User Data Repository (UDR). As illustrated, the PCC architecture may also include a Traffic Detection Function (TDF) 36, a Bearer Binding and Event Reporting Function (BBERF) 39, an Offline Charging System (OFCS) 42, and/or an Online Charging System (OCS) 44.

The PCRF 30 is configured to perform policy control decision and/or flow based charging control. The PCRF 30 may provide network control regarding detection of service data flows detection, gating, QoS, and/or flow based charging towards the PCEF 34. For this purpose, the PCRF 30 may signal PCC rules to the PCEF 34. The PCEF 34 may be configured to perform service data flow detection, policy enforcement and flow based charging functionalities, which is typically accomplished by applying the PCC rules as signaled by the PCRF 30. Further, the PCEF 34 may also implement functionalities of packet inspection, such as Deep Packet Inspection (DPI), and service classification. In this way data packets may be classified according to PCC rules defined in the PCEF 34 and be assigned to a certain service.

In the illustrated implementation, the PCEF 34 may be responsible for enforcing policies with respect to authentication of subscribers, authorization to access and services, and accounting and mobility. The PCRF 30 may be responsible for managing individual policies defining network, application, and subscriber conditions that must be met in order to successfully deliver a service or maintain the QoS of a given service. Such policies may be provided by the PCRF through PCC rules. The repository 38, which may be a standalone database or integrated into an existing subscriber database such as a Home Subscriber Server (HSS), may include information such as entitlements, rate plans, etc. The repository 38 may provide subscription data such as a subscriber's allowed services, a pre-emption priority for each allowed service, information on a subscriber's QoS parameters, e.g., a subscribed guaranteed bandwidth QoS, a subscriber's charging related information, e.g., location information relevant for charging, a QoS related subscriber category, e.g., whether the subscriber is a gold user to be provided with a high QoS or a silver or bronze user to be provided with lower QoS. The repository 38 may also store a CF subscriber category, e.g., defining that the subscriber belongs to a certain category of subscribers having the same CF requirements.

Basic functionalities of the TDF 36 include monitoring the data traffic of a UE so as to detect usage of specific services. This monitoring may for example be based on DPI. Here, DPI may include inspection and analysis of data packet content and service classification based on said analysis. This may be accomplished on the basis of a configured set of classification rules, e.g., provided by the PCRF 30 through ADC rules. The TDF 36 allows for defining policies with regard to the detected services. Accordingly, service awareness in traffic differentiation can be improved by the TDF 36.

The PCRF 30 is typically implemented in a standalone node. As illustrated in FIG. 1, the PCEF 34 may in turn be implemented within an access gateway, e.g., the gateway 26 which may be a GGSN or a PDN-GW. The PCEF 34 may also be implemented in some other node routing the data packets of an IP Connectivity Access Network (IP-CAN) session of the UE. The TDF 36 may in turn be implemented as a stand-alone node or may be co-located with a gateway routing the data packets to or from the UE. For example, the TDF 36 may be co-located in the same gateway with the PCEF 34.

As further illustrated in FIG. 1, the nodes of the PCC architecture are coupled to each other by interfaces or reference points termed as Gx, Gxx, Gy, Gz, Sp, and Rx. The Gx reference point resides between the PCRF 30 and the gateway 26, and allows for communication between the PCRF 30 and the PCEF 34. The Gxx reference point resides between the PCRF 30 and the BBERF 39. The Gy reference point resides between the gateway 26 and the OCS 44. The Gz reference point resides between the gateway 26 and the OFCS 42. The Rx reference point resides between the AF 50 and the PCRF 30. The Sp reference point resides between the repository 38 and the PCRF 30. The Sd reference point resides between the TDF 36 and the PCRF 30. Details concerning the implementation of these interfaces can be found in the 3GPP TSs, e.g., 3GPP TS 23.203 and 3GPP TS 29.212, 29.213 and 29.214. It should be noted that different interfaces could be used in other implementations.

When a UE initiates a user session through the mobile network, the PCEF 34 may indicate this to the PCRF 30, which in turn provides the PCEF 34 with PCC rules to be applied to this user session. A PCC rule may comprise a set of information enabling the detection of a data flow of a data session of a UE and providing parameters for policy control and/or charging control of a data flow of said data session. The TDF 36 can perform DPI for data flows belonging to said user session, which may involve inspecting contents of IP data packets of these data flows beyond the so called IP-5 tuple, i.e., beyond IP source/destination addresses and ports, and the type of used transport protocol. On the basis of the inspection, the TDF 36 can then report application or service usage information to the PCRF 30 for these data traffic flows. This information may in turn be used by the PCRF 30 to provide updated policy rules to the TDF 36 or to the PCEF 34. The PCEF 34 and the PCEF 34 may then apply these policy rules to the data flows.

For explaining an exemplary implementation of the concepts of content-level traffic differentiation in more detail, it will be assumed that a subscriber uses a UE for connecting to a mobile network equipped with a PCC architecture as illustrated in FIG. 1. The UE may then register an identifier of the subscriber in the mobile network. The identifier may for example be a Mobile Subscriber International Subscriber Directory Number (MSISDN), an International Mobile Subscriber Identity (IMSI), a Session Initiation Protocol (SIP) URL, or similar type of subscriber identifier. Depending on the subscriber identifier, the PCRF 30 may then dynamically determine the CF rule(s). The dynamic determination may in particular be based on the location of the UE and/or a time schedule. The time schedule may for example depend on the time of the day and/or on the day of the week. The determination may also take into account subscriber related data, e.g., as stored in relation to the subscriber identifier in the repository 38. For example, such subscriber related data may include information about a CF subscriber category the subscriber is assigned to. The CF subscriber category is herein also referred to as "static CF group".

The dynamic determination of the CF rule(s) may comprise selecting between a first set of one or more CF rules and a second set of one or more CF rules to be applied to the data traffic of the UE. The first set of CF rules may allow the UE to receive or send a certain type of content while the second set of CF rules denies the UE to receive or send this type of content. Depending on the location of the UE and/or depending on the time schedule, either the first set of CF rules or the second set of CF rules may be selected, thereby achieving a dynamic adaptation of the CF treatment for this UE. The first and second sets of CF rules may in turn be stored in relation to the subscriber identifier or in relation to a CF identifier assigned to the UE or subscriber. The CF identifier may define a "dynamic CF group" to which the UE or subscriber is assigned depending on the location of the UE and/or the time schedule.

By providing at least two different CF rules for a given subscriber, it becomes possible to apply different CF rules to the data traffic of the subscriber's UE, depending on the location of the UE and/or depending on the time of the day or the day of the week. In an exemplary usage scenario, this may for example be utilized to grant a corporate user of a certain corporation access to a certain type of content while the subscriber's UE is located at the office and/or during working hours, and to otherwise deny access to this type of content.

In the PCC architecture of FIG. 1, the dynamic determination of the CF rule(s) to be applied may be accomplished by the CF control logic 32 of the PCRF 30. The CF rules(s) to be applied may then be indicated to one or more other nodes involved in routing data traffic of the UE, e.g., via the Gx interface to the PCEF 34 or via the Sd interface to the TDF 36. Such nodes may then apply the CF rule(s) to the data traffic of the UE, e.g., by blocking certain data flows. Such data flows may for example be identified by inspecting destination and/or source IP address or transport port of a data packet in the data flow. In some cases, the data flows may also be identified by performing a deeper inspection of the data packet content, e.g., with respect to the type of protocol above the IP layer, e.g., either TCP or User Datagram Protocol (UDP), a type of service associated with the data packet, e.g., HTTP, Session Initiation Protocol (SIP), File Transfer Protocol (FTP), or the like. In some cases it is also possible to inspect the data traffic with respect to an identifier of a network resource, e.g., a URL of the server that receives or sends the data packets.

According to some scenarios, the dynamic determination is initiated by the PCRF 30 by assigning, depending on the location of the UE and/or depending on the time schedule, the CF identifier to the UE or subscriber. This assignment may be accomplished on the basis of a mapping scheme relating different timeslots and/or different locations to corresponding CF identifiers. An example of such a mapping scheme is illustrated in the table of FIG. 2. The PCRF 30 may then indicate the assigned CF identifier via the Gx interface to the PCEF 34 and/or via the Sd interface to the TDF 36. As illustrated in FIG. 2, the mapping scheme may also be based on the CF subscriber category or "static CF group" of the subscriber.

For example, the PCRF 30 may first determine an identifier of the static CF group to which the subscriber belongs. For example, the identifier of the static group may be obtained from subscriber profile data as stored in the repository 38, e.g., based on an individual identifier of the subscriber associated with the UE. For example, the repository 38 can store a static CF group identifier in relationship with the individual identifier of a certain subscriber, e.g., in relation to the subscriber's MSISDN, SIP-URL, or the like. The static CF group identifier can be the same as for other subscribers. For example, the same CF group identifier may be shared by, i.e., simultaneously associated with, a plurality of subscribers. Such subscribers could for example be employees of the same corporation or be members of some other group or category of subscribers who share the same content filtering requirements. In FIG. 2, this is schematically illustrated by the different rows denoted by "Subscriber Type #n". Examples of such static groups are: under-aged with parental control service or corporate user with company restrictions.

Subsequently, the PCRF 30 may select, further depending on the location of the UE and/or on the present time, the corresponding CF identifier. Accordingly, the CF identifier indicates a "dynamic CF group" to which the subscriber is assigned. In other examples, the mapping scheme could consider the static and dynamic CF groups independently and indicate both an identifier of the dynamic CF group and an identifier of the static CF group to the PCEF 34 and/or TDF 36.

As can be appreciated, a high degree granularity can be obtained. For example, "subscriber type 1" an "subscriber type 2" in the table of FIG. 2 can both be assigned to subscriber identifiers of subscribers of the same company, subscriber type 1 corresponding to research staff, and subscriber type 2 corresponding to other kinds of employees. Examples of the different timeslots could be working hours, e.g., 8:00-18:00 and non-working hours, e.g., 18:00-8:00. The different locations could distinguish between a location in the office at home or elsewhere, could distinguish between a location in a congested cell or a non-congested cell, or could distinguish between locations in the coverage areas of different radio access technologies such as WiFi, 3G, and 2G.

More specifically, when using a mapping scheme as illustrated in FIG. 2, the PCRF 30 may first determine the static CF group of the subscriber. This determination may be based on the subscriber identifier and involve obtaining subscriber profile data from the repository, using the subscriber identifier as a key for finding the subscriber profile data related to the subscriber associated with the UE. Then the PCRF 30 may determine the dynamic CF group or CF identifier, which may be used to finally determine the CF policy to be applied to the data traffic of the UE. The determination of the dynamic CF group is based on the location of the UE and/or on the time schedule. According to an alternative example, when the UE is located at a certain location, e.g., in the office, and in a certain timeslot, e.g., during office hours, the PCRF 30 can indicate to the PCEF 34 and/or to the TDF 36 a either a first CF identifier or a second CF identifier. The first CF identifier may for example correspond to a corporation the subscriber is employed at, in order to apply a CF policy which is applicable for group of subscribers employed by the corporation. The first CF identifier could be related to a CF policy which is based on the location of the UE and/or the time schedule. The second CF identifier could be the subscriber identifier, in order to apply a default CF policy which is defined for the individual subscriber. The default CF policy could be applicable when according to the location of the UE and/or the time schedule, other CF policies, such as the one related to the first identifier, are not applicable.

Accordingly, the static CF group and dynamic CF group in the above examples do not necessarily imply that a direct relationship between individual subscriber identifier of a user and the static CF group is established. Rather, a static CF group could also be formed on the basis of other identifiers assigned to the subscriber, and the static and/or dynamic CF group may be formed on the basis of a combination of such identifiers assigned to the subscriber. In the example of FIG. 2, static CF groups are grouped in categories and various dynamic CF group identifiers, or CF identifiers, can be assigned to the same static CF group, depending on the location of the UE and/or the time schedule, i.e., the present time in relation to one or more predefined timeslots.

The PCEF 34 or TDF 36 may then use the CF identifier or identifiers received from the PCRF 30 to determine the CF rule(s) or policies to be applied to the data traffic of the UE. For this purpose, the node implementing the PCEF 34 or TDF 36 may store the CF rule(s) in relation to the CF identifier. Alternatively, an external CF policy server may store the CF rule(s) in relation to the CF identifier, and the node implementing the PCEF 34 or TDF 36 may request the CF rules(s) from this CF policy server. For example, such external CF policy server could operate on the basis of the Internet Content Access Protocol (ICAP) according to IETF RFC 3507. For example, such request to the CF policy server may indicate the CF identifier determined by the PCRF 30 and/or an identifier of content in the data traffic of the UE, e.g., in term s of a URL. In the latter case, the CF policy server may respond to the request by indicating whether the concerned content should be allowed or blocked.

If the CF rule(s) are stored in the node implementing the PCEF 34 or TDF 36, the node itself may determine the type of content in the data traffic of the UE, e.g., on the basis of a URL in the data traffic, and apply the CF rule(s) determined from the CF identifier to admit or block the content according to its type. Alternatively, the node implementing the PCEF 34 or the TDF 36 could also send a request indicating an identifier of content in the data traffic to a CF policy server, e.g., an ICAP server, and receive a response indicating the type of the content from the CF policy server. The node may then apply the CF rule(s) determined from the CF identifier to admit or block the content according to its type.

According to an exemplary implementation, the PCRF 30 may receive a Credit Control Request (CCR) message of the Gx interface protocol during establishment of an IP-CAN session for the UE. This message may also indicate the subscriber identifier. Upon reception of this initial CCR message, the PCRF 30 may determine the CF subscriber category, i.e., the static CF group and also the CF identifier, i.e., dynamic CF group, for this user session. Criteria for determining the static CF group may be based on parameters obtained from the repository 38, e.g., on subscription profile data of the subscriber such as parameters relating to parental control, defining whether the user is a corporate user or a private user, or the like. Such parameters may be stored in the repository 38 in relation to the subscriber identifier, and the PCRF 30 may use the subscriber identifier as a key when obtaining such information. Criteria for selecting the applicable dynamic CF group are based on dynamic parameters such the location of the UE and/or on the time schedule. Such parameters may be determined by the PCRF 30 itself or obtained from external nodes through one or more of the various interfaces of the PCRF 30. For example, the location of the UE could be indicated to the PCRF 30 by the PCEF 34 in the initial CCR message. For determining the dynamic parameters, the PCRF 30 could also obtain information from external nodes which depends on the location of the UE and/or on the time of the day. Such external nodes may be nodes which currently route and/or process data traffic of the UE, e.g., a node implementing the PCEF 34, a node implementing the TDF 36, or the like.

The PCRF 30 may then use the received information, i.e., concerning static CF group and dynamic CF group, to determine the CF identifier to be conveyed to the PCEF 34 and/or TDF 36. The PCEF 34 and/or the TDF 36 may then use the CF identifier to determine the CF rule(s) to be applied for this IP-CAN session and enforce these CF rule(s).

As a result, the CF rule(s) which are applied to the data traffic of the UE can dynamically vary with the time and/or location of the UE. This may for example be useful for allowing access to a particular type of content for a subscriber working for a certain corporation while the subscriber's UE is located in certain geographical area, e.g., within or near the premises of the corporation, and/or during certain time periods, e.g., during working hours, while access to this type of content is otherwise denied for this subscriber. The information that the subscriber works for the corporation defines the static CF group, whereas the location of the UE and/or the time schedule determines the dynamic CF group.

Figure 3:
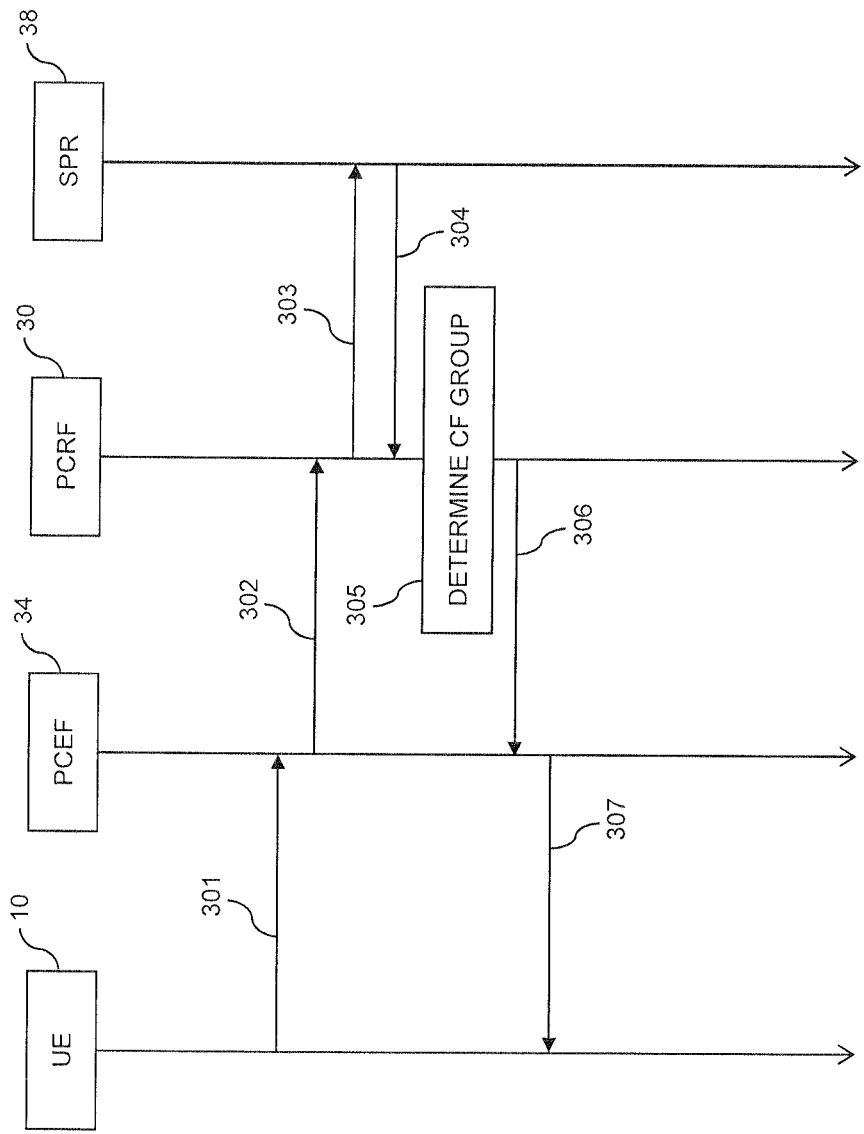
FIG. 3 shows a signaling diagram for illustrating a procedure according to an embodiment of the invention.

FIG. 3 shows a timing diagram for illustrating an exemplary procedure for implementing the above concepts. The procedures of FIG. 3 involve the UE 10, the PCEF 34, and the PCRF 30.

In the illustrated example, by sending message 301 to the PCEF 34, the UE 10 initiates establishment of a IP-CAN bearer. Message 301 may for example be an Establish IP-CAN Bearer Request.

By sending message 302 to the PCRF 30, the PCEF 34 indicates IP-CAN session establishment to the PCRF 30. Message 302 may for example be an initial CCR request, and can include one or more identifiers related to the subscriber associated with the UE 10, which are received from the UE 10 during initial signaling, e.g., as illustrated in a simplified manner by message 301.

The PCRF 30 may then proceed by sending message 303 to the repository 38 to request subscriber profile data related to the subscriber of the UE 10. Message 303 may include one or more identifiers related to the subscriber associated with the UE 10. This identifier may be used to identify the subscriber profile data of this particular subscriber. The repository 38 responds to the request by sending message 304 to the PCRF 30.

At step 305, the PCRF 30 may then assign the CF identifier to the data traffic of the UE 10, i.e., to data packets of the established IP-CAN session. In accordance with the above principles, this assignment is accomplished dynamically, i.e., on the basis of the location of the UE 10 and/or on the basis of a time schedule, e.g., depending on the time of the day or the day of the week. The assignment may further depend on the subscriber profile data received with message 304. In addition, the PCRF 30 may also determine PCC rules to be applied by the PCEF 34.

The PCRF 30 then sends message 306 to the PCEF 34. By message 306, the PCRF 30 may acknowledge IP-CAN session establishment and provide PCC rules to the PCEF 34. Further, message 306 may indicate the assigned CF identifier to the PCEF 34. For this purpose, a corresponding Attribute Value Pair (AVP) in the message 306 could be utilized. Message 306 may for example be a Credit Control Answer (CCA) message.

The PCEF 34 may then send message 307 to the UE 10 to acknowledge IP-CAN bearer establishment to the UE 10. Message 307 may for example be an Establish IP-CAN Bearer Response.

Figure 4:
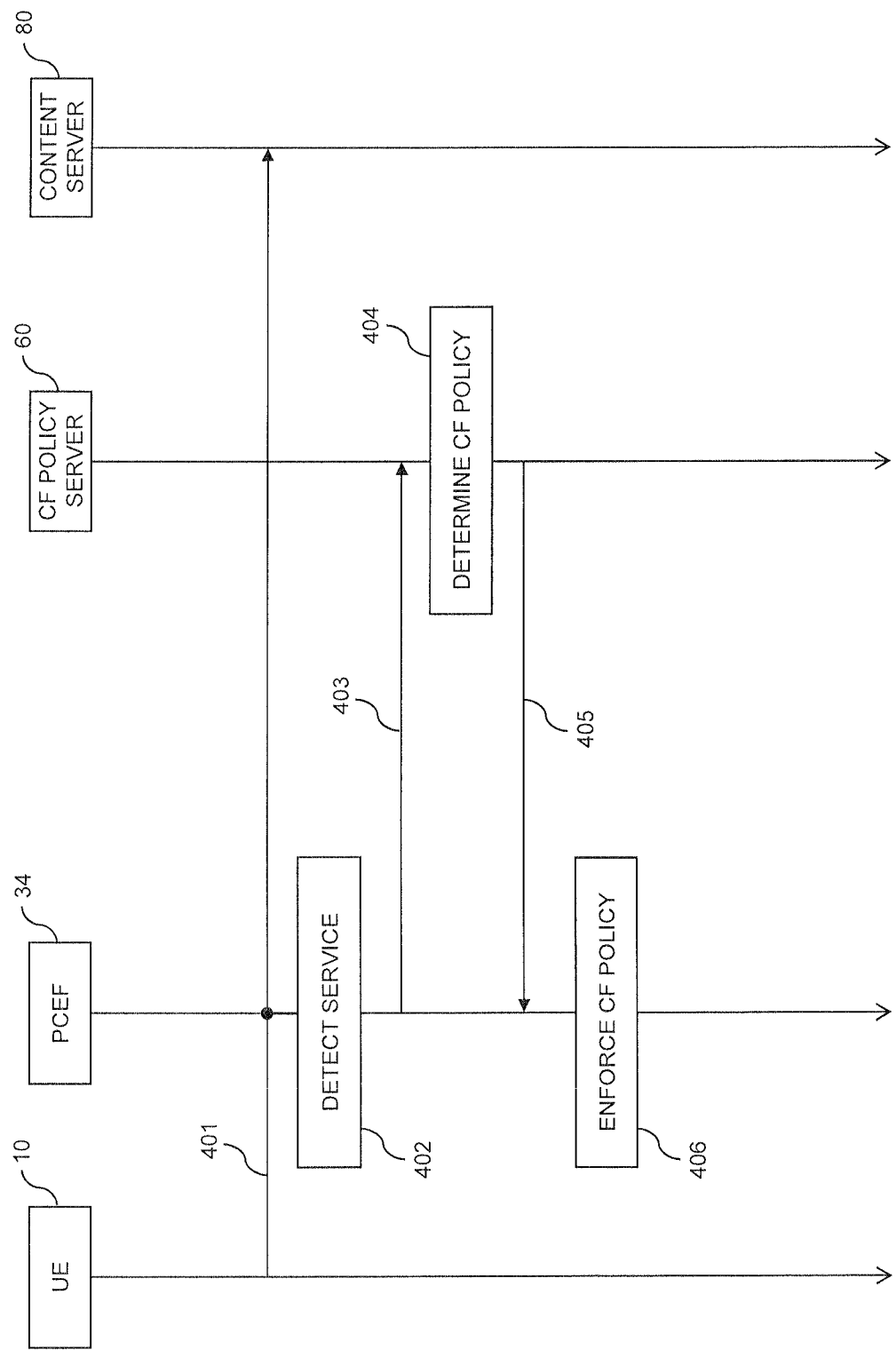
FIG. 4 shows a signaling diagram for illustrating further procedures according to an embodiment of the invention.

FIG. 4 shows a timing diagram for illustrating further exemplary procedures for implementing the above concepts. The procedures of FIG. 4 involve the UE 10, the PCEF 34, the CF policy server 60, and a content server 80. In the procedures of FIG. 4, it is assumed that the subscriber of the UE 10 starts a user session involving transmission of content to or from the content server 80, e.g., in the course of a HTTP session. The procedures of FIG. 4 may be performed after dynamically assigning a CF identifier to an IP-CAN session, e.g., using the procedures of FIG. 3.

In the procedures of FIG. 4, the UE 10 sends message 401 to the content server to request content. Message 401 may for example be a HTTP GET message. Message 401 may include an identifier of the requested content, e.g., in terms of a URL.

At step 402, the PCEF 34 detects a certain service in the IP-CAN session of the UE 10, e.g., by inspecting the data packet including the HTTP GET message.

In response to detecting the service at step 402, the PCEF 34 sends a request 403 to the CF policy server 60. The request 403 may indicate the CF identifier dynamically assigned by the PCRF 30. The request 403 may also include a content identifier, e.g., the URL from message 401. If the CF policy server 60 is implemented on the basis of the ICAP, the request 403 may be an ICAP REQMOD request.

At step 404, the CF policy server 60 determines a CF policy. For example, the CF policy server 60 may utilize the content identifier indicated by message 403 to determine a type of the content requested by the UE 10, e.g., whether the content corresponds to an advertisement information type, an adult information type, an audio information type, a video information type, a violence information type, or the like.

Further, the CF policy server 60 may utilize the CF identifier indicated by message 403 to select a CF rule associated with the CF identifier and indicating whether the determined type of content should be blocked or admitted.

By sending response 405 to the PCEF 34, the CF policy server 60 may then indicate the CF policy to the PCEF 34. In particular, the response may indicate whether the content to which the request 403 pertains should be blocked or admitted. If the CF policy server 60 is implemented on the basis of the ICAP, the response 405 may be an ICAP REQMOD answer.

At step 406, the PCEF 34 enforces the CF policy indicated by the CF policy server by either blocking or admitting the content requested by the UE 10. Here, it should be noted that this may involve distinguishing between different types of content transmitted within the same service. That is to say, while some types of content transmitted in the service are blocked, others may be admitted.

It should be noted that when assuming a scenario of detecting a new service originating or terminating at the UE 10, the PCEF 34 in the procedures of FIGS. 3 and 4 could also be replaced by the TDF 36. In this case, the step of enforcing the CF policy may involve triggering a report of detected traffic for some types of content, and suppressing such a report for other types of content.

As can be seen, the above concepts may involve extending the information conveyed on the Gx and/or Sd interfaces with additional information for allowing the PCEF 34 or TDF 36 to apply CF on the data traffic of the UE. Such additional information may for example be provided in terms of the CF identifier. Alternatively, the additional information may explicitly define the applicable CF rule(s).

One example conveying such additional information is to use a corresponding AVP in the Gx protocol between a PCRF 30 and the PCEF 34 or in the Sd protocol between the PCRF 30 and the TDF 36. For example, an AVP of the grouped type could be used which includes the additional information in a sub-AVP. The AVP for conveying the CF information can be included in any message related to an IP-CAN session of a UE 10 and sent from the PCRF 30 to the PCEF 34 or to the TDF 36. For example, the message may relate to the initial establishment of the IP-CAN session, or the message may relate to a modification of the IP-CAN session. The message may be a CCA message received from the PCRF 30 as an acknowledgement to a CCR message to the PCRF 30 when the IP-CAN session is initiated by the UE. The PCEF 34 or TDF 36 may then store the information from this AVP at use it for subsequent enforcement of CF rules. Later during the IP-CAN session, the PCRF 30 can include the AVP either in a subsequent CCA update message or in a Re-Authorization Request (RAR) message to indicate dynamic changes of CF information. In such cases, the PCEF 34 or TDF 36 may update the stored information from this AVP and apply the updated information for enforcement of CF rules. Such updates may for example occur if during the IP-CAN session the location of the UE changes from a first area to a second area. Such updates may also occur if the IP-CAN session extends from a time, e.g., predefined working hours, in which a certain CF profile applies, to a later time, e.g., outside the working hours, in which another CF profile applies. Such updates may also occur if the subscriber's subscriber profile data with respect to CF are modified during the IP-CAN session.

During the user IP-CAN session, each time the UE requests content, e.g., by sending a HTTP GET message, this can be detected by the PCEF 34 or TDF 36, and the appropriate CF policy can be applied on the basis of the content type the requested content and the additional dynamic CF information provided by the PCRF 30.

Using these concepts, the PCRF 30 may send the additional information to a node performing CF on the data traffic of the UE, e.g., at IP-CAN session establishment. Such node may then use the additional information for applying CF policy. The CF policy may consider the identity of the individual subscriber and the CF subscriber category to which the subscriber is assigned for CF purposes. In the above concepts, the CF identifier is a dynamic characteristic determined by the PCRF 30 and conveyed to the PCEF 34 and/or TDF 36. The CF identifier can be determined at IP-CAN session establishment and can be updated during the IP-CAN session lifetime, e.g., if the UE keeps the IP-CAN session alive while moving to a different location, and/or as if IP-CAN session extends over a certain point of time in the time schedule.

As mentioned above, the PCEF 34 or the TDF 36 may request information from a CF policy server operating on the basis of the ICAP. For this purpose, an ICAP request may be modified to include additional information in the form of the CF identifier which is dynamically determined by the PCRF 30. In FIG. 5, an example of such a modified ICAP request is further illustrated.

In the example of FIG. 5, the ICAP request is an ICAP REQMOD message. As can be seen, the ICAP REQMOD message includes an additional information element referred to as "Group-Identifier". In this information element, the PCEF 34 or TDF 36 may include the CF identifier indicated by the PCRF 30. As further illustrated, the ICAP REQMOD message also includes a content identifier in the form of a URL in the information element "Host".

Upon receiving the ICAP REQMOD message, the CF policy server may use the CF identifier to determine the CF rule(s) to be applied to the content identified by the URL. On the basis of such CF rule(s), the CF policy server may then decide whether the identified content should be admitted or blocked and indicate the result of this decision as a CF policy to the PCEF 34 and/or TDF 36. For this purpose, corresponding information may be configured in the CF policy server. Namely, relational information may be configured in the CF policy server which allows for determining the CF policy in relation to the content identifier indicating which content is requested, and in relation to the CF identifier dynamically assigned to the subscriber. Such information may for example correspond to a decision table as illustrated in FIG. 6.

In the decision table of FIG. 6, three CF identifiers are illustrated by way of example. Also, the table mentions different content types. In the example of FIG. 6, these content types are: a weather information type, a news information type, an advertisement information type, an adults information type, a violence information type, and an infants information type. A CF policy defines whether such a content type should be blocked or allowed. This may vary depending on the CF identifier. In some cases, as illustrated by CF identifier 2 of FIG. 6, it is also possible to allow all content types. The CF policy server may first determine the content type from the content identifier in the request from the PCEF 34 or TDF 36. Then, the CF policy for this content type may be determined depending on the CF identifier. The resulting CF policy may then be included in the response to the request from the PCEF 34 or TDF36. If the content indicated in the request should be blocked, the response from the CF policy server may for example include a "HTTP/1.1. 403" error value.

In other implementations, the CF identifier is used within the PCEF 34 or the TDF 36 for determining the actual CF policy to be applied to certain content, e.g., as identified by a URL in a request for the content. For this purpose, the PCEF 34 or TDF 36 itself may classify the content, i.e., determine the content type. For this purpose, the node implementing the PCEF 34 or TDF 36 may be provided with a database relating URLs or other content identifiers to certain content types. Alternatively, the PCEF 34 or TDF 36 may utilize an external server for determining the content type. For example, such an external server could be a CF policy server operating on the basis of the ICAP. The PCEF 34 or TDF 36 could send a request to the server which includes a content identifier of the requested content, e.g., in the form of a URL: The request could for example be an ICAP REQMOD message as specified in IETF RFC 3507. The response from the server may then indicate the content type of the requested content.

Figure 7:
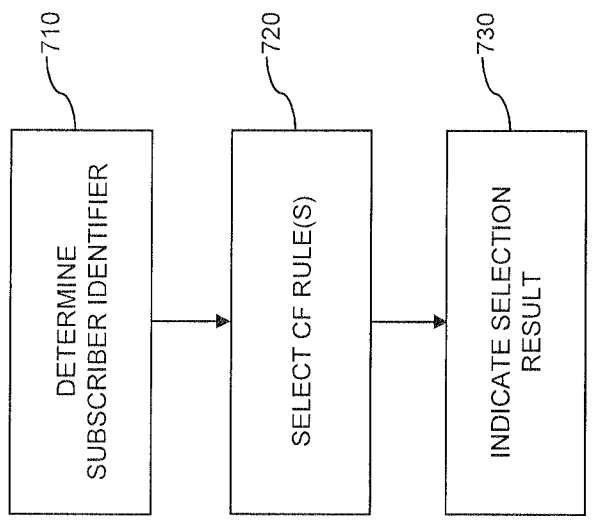
FIG. 7 shows a flowchart for illustrating a method according to an embodiment of the invention.

FIG. 7 shows a flowchart illustrating a method for implementing the above concepts of content-level traffic differentiation in a policy controller of a communication network, e.g., in the PCRF 30 of the PCC architecture of FIG. 1.

At step 710, the policy controller determines an identifier of a subscriber associated with a UE connected to the communication network. This may for example be accomplished in response to the UE connecting to the communication network, e.g., upon establishing an IP-CAN session of the UE. The identifier of the subscriber may for example be a MSISDN, an IMSI, a SIP-URL, or the like.

At step 720, the policy controller performs a selection between at least a first set of one or more CF rules and a second set of one or more CF rules associated with the subscriber identifier. This selection is based on a location of the UE and/or a time schedule. The selection may further be based on subscriber profile data of the subscriber. For example, the subscriber profile data may categorize the subscriber into a category or type of subscribers having the same CF requirements. Such a CF subscriber category may for example be an infants category, an adults category, a certain category of employees of a company, or the like.

At step 730, the policy controller indicates a result of the selection to at least one node configured to perform, on the basis of the selected set of one or more CF rules, content filtering of data traffic of the UE. This node may for example be a node implementing a PCEF, e.g., the PCEF 34, or a node implementing a TDF, e.g., the TDF 36. The indication of the selection result may for example involve assigning a CF identifier to the data traffic of the UE and providing the CF identifier to the node. The CF identifier may then be used by the node to determine the selected set of one or more CF rules. Alternatively, the indication of the selection result may involve providing the selected set of one or more CF rules to the node.

Figure 8:
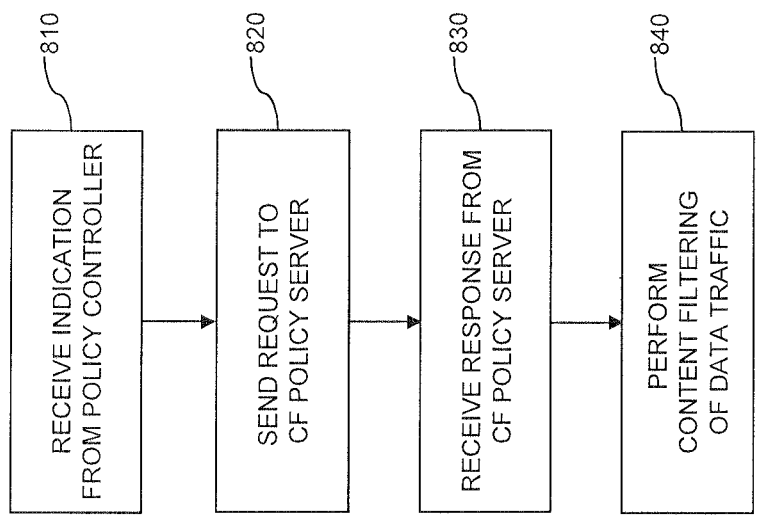
FIG. 8 shows a flowchart for illustrating a further method according to an embodiment of the invention.

FIG. 8 shows a flowchart illustrating a method for implementing the above concepts of content-level traffic differentiation in a node of a communication network, e.g., in a node implementing the PCEF 34 or the TDF 36 of the PCC architecture of FIG. 1.

At step 810, the node receives an indication from a policy controller of the communication network, such as the PCRF 30. The indication indicates a result of a selection between at least a first set of one or more CF rules and a second set of one or more CF rules. The first and the second set of CF rules are related to an identifier of a subscriber associated with a UE connected to the communication network. The selection is based on a location of the UE and/or a time schedule. The received indication may include a CF identifier assigned to the data traffic of the UE. The node may then determine the selected set of one or more CF rules from the CF identifier. Alternatively, the received indication may include the selected set of one or more CF rules.

If the received indication of step 810 comprises the CF identifier, the determination of the selected set of one or more CF rules may further include sending a request to a CF policy server at step 820 and receiving a response from the CF policy server at step 830. The CF policy server may for example be implemented on the basis of the ICAP. The request of step 820 may include the CF identifier and may also include a content identifier of content in the data traffic of the UE, e.g., in the form of a URL from a request for the content. The response of step 830 may indicate at least a part of the selected set of one or more CF rules. For example, the response may indicate whether content identified by the request of step 820 should be blocked or admitted. The response of step 830 may also indicate a type of the content identified by the content identifier in the request of step 820.

At step 840, the node performs content filtering of data traffic of the UE. This is accomplished on the basis of the selected set of one or more CF rules. This may also be accomplished on the basis of the type of the content indicated by the response of step 830.

It is to be understood that the methods of FIGS. 7 and 8 may be combined with each other. In particular, the method of FIG. 7 may be used to send the indication received at step 810 of FIG. 8.

Figure 9:
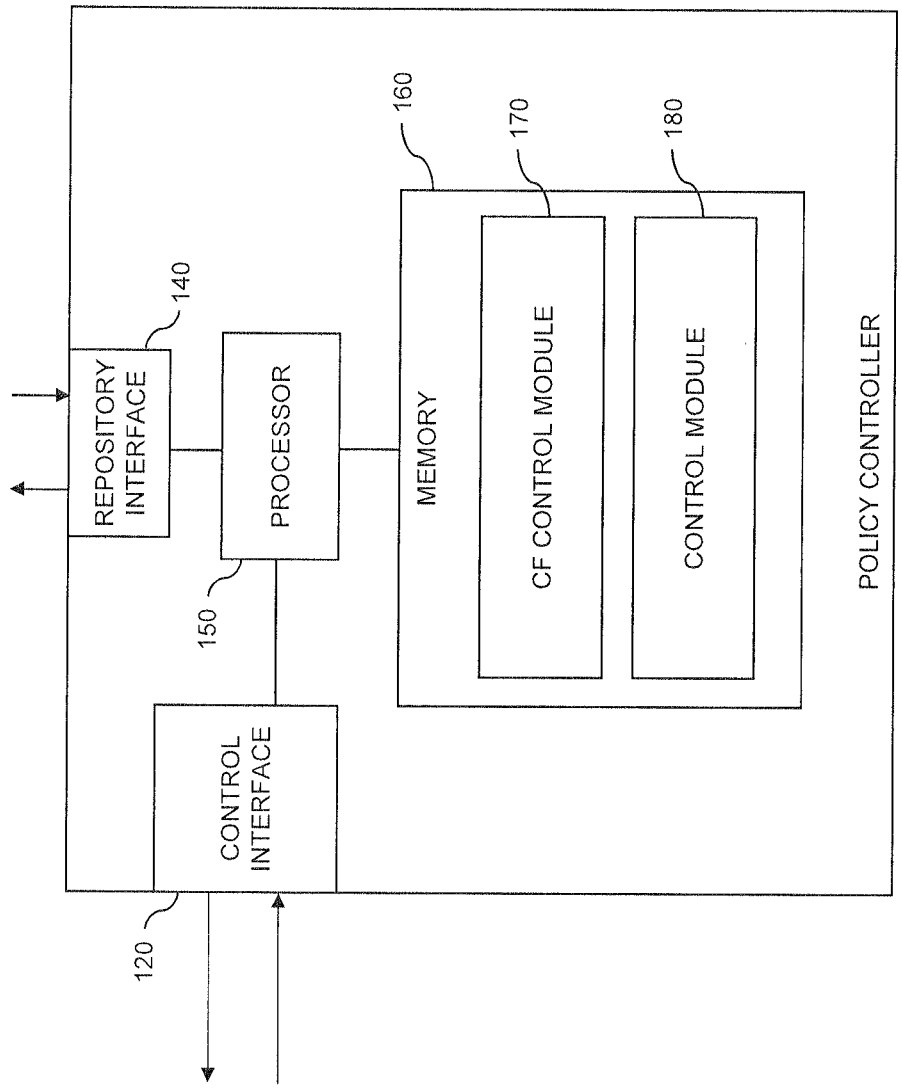
FIG. 9 schematically illustrates a policy controller according to an embodiment of the invention.

FIG. 9 further illustrates an exemplary implementation of a policy controller. The policy controller of FIG. 9 may for example correspond to the above-mentioned PCRF 30.

In the illustrated example, the policy controller includes a control interface 120 for communication with one or more other nodes, e.g., the PCEF 34 or the TDF 36. In the 3GPP PCC architecture as illustrated in FIG. 1, the control interface 120 may correspond to the Gx interface or to the Sd interface, depending on the type of controlled node. Further, the node may include a repository interface 140 with respect to a repository storing subscriber profile data, e.g., the repository 38. The repository interface 140 may for example correspond to the Sp interface.

Further, the node includes a processor 150 coupled to the interfaces 120, 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the PCRF 30. More specifically, the memory 160 may include a CF control module 170 so as to implement the above-described functionalities of selecting a set of CF rules, e.g., by determining the CF group identifier. Further, the memory 160 may also include a control module 180, e.g., for controlling interaction of the policy controller with other nodes and providing generic control functionalities.

It is to be understood that the structure as illustrated in FIG. 9 is merely schematic and that the policy controller may actually include further components which, for the sake of clarity, have not been illustrated, e.g., further interfaces such as an interface with respect to an AF. Also, it is to be understood that the memory 160 may include further types of program code modules, which have not been illustrated, e.g., program code modules for implementing known functionalities of a PCRF. According to some embodiments, also a computer program product may be provided for implementing functionalities of the node, e.g., in the form of a medium storing the program code to be stored in the memory 160.

Figure 10:
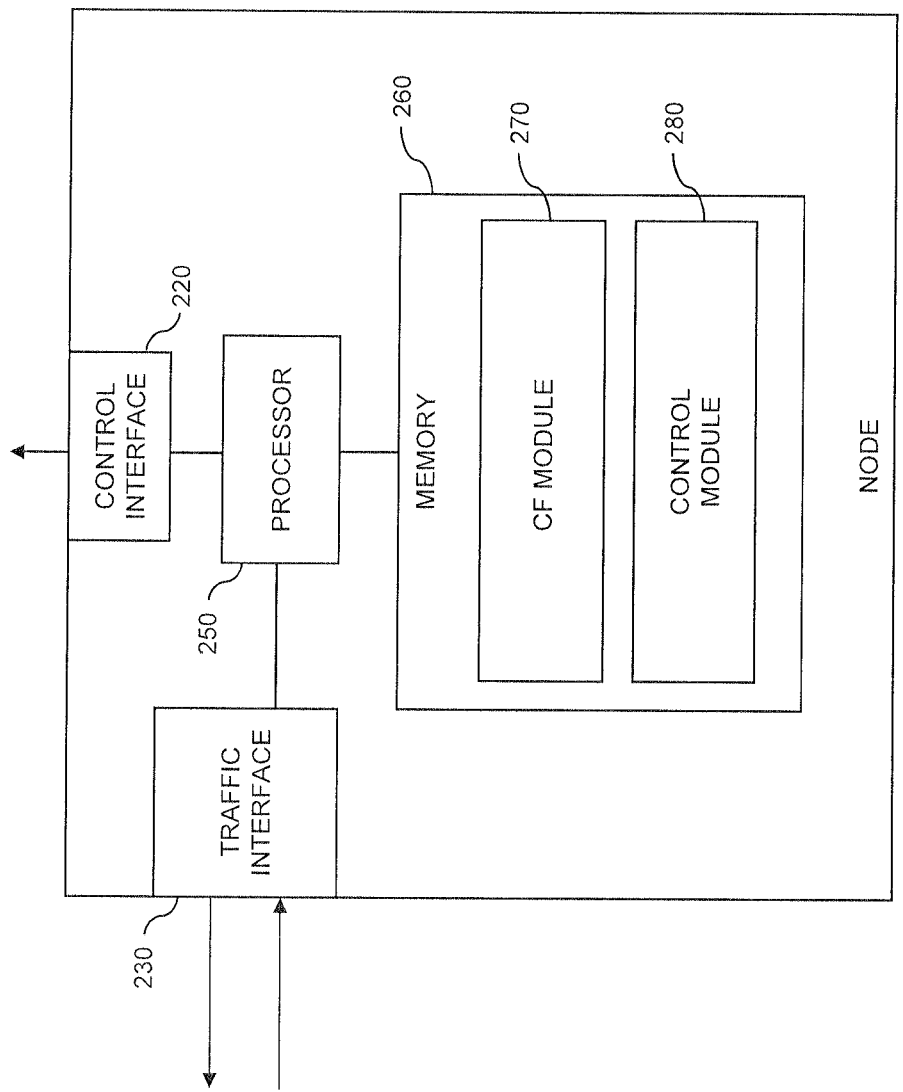
FIG. 10 schematically illustrates a node according to an embodiment of the invention.

FIG. 10 further illustrates an exemplary implementation of a node for a communication network. The node may be configured to route or process data traffic of a UE connected to the communication network. For example, the node may implement a PCEF, e.g., the PCEF 34, or a TDF, e.g., the TDF 36.

In the illustrated example, the node includes a control interface 220 for communication with a policy controller, e.g., the PCRF 30. In addition, the node may include a traffic interface 230, e.g., for receiving or sending transmitting the data traffic of the UE, e.g., the UE 10. If the node implements a PCEF, the control interface 220 may correspond to the Gx interface. If the node implements a TDF, the control interface 220 may correspond to the Sd interface. Further, the node includes a processor 250 coupled to the interfaces 220, 230 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor 250 so as to implement the above-described functionalities for enforcing CF policies on the data traffic of the UE. More specifically, the memory 260 may include a CF module 270 for applying CF policies by selectively allowing or blocking certain types of content. Further, the memory 260 may also control module 280, e.g., for controlling interaction of the policy controller with other nodes and providing generic control functionalities.

It is to be understood that the structure as illustrated in FIG. 10 is merely schematic and that the node may actually include further components which, for the sake of clarity, have not been illustrated, e.g., further interfaces such as an interface with respect to a CF policy server. Also, it is to be understood that the memory 260 may include further types of program code modules, which have not been illustrated, e.g., program code modules for implementing known functionalities of a PCEF or TDF, e.g., DPI. According to some embodiments, also a computer program product may be provided for implementing functionalities of the node, e.g., in the form of a medium storing the program code to be stored in the memory 260.

As can be seen, the concepts as described above may be used for efficiently providing content-level differentiation of data traffic in a communication network, e.g., a communication network utilizing a PCC architecture in accordance with 3GPP TS 23.203. In such a PCC architecture, the concepts allow for applying dynamically variable CF policies in the TDF or PCEF. The concepts allow for obtaining a high degree of granularity and flexibility in traffic differentiation. Further, the concepts may enable application of common CF policies to a for a group of subscribers, e.g., subscribers working for a certain corporations. Further, the CF identifier of the above concepts may also be useful for other purposes, such as charging. For example in a PCC architecture according to 3GPPP 23.203 it may be included in messages of the Gz interface (for offline charging) or in messages of the Gy interface (for online charging). This may for example allow for dynamically differentiating the charging behavior for certain types of content.

It is to be understood that the examples and embodiments as explained above are merely illustrative and susceptible to various modifications. For example, the concepts could be used in various types of communication networks, e.g., in a communication network using fixed access technology such as Digital Subscriber Line (DSL) or coaxial cable or a converged fixed and mobile communication network. Moreover, it is to be understood that the above concepts may be implemented by using correspondingly designed software to be executed by a processor of an existing device, or by using dedicated device hardware.

The invention claimed is:

1. A method of differentiating data traffic, at the content level, in a Policy and Charging Control (PCC) architecture in a communication network, the method comprising:
    a policy controller in the PCC architecture determining a first group identifier associated with a subscriber associated with a user equipment connected to the communication network;
    on the basis of a location of the user equipment, the policy controller in the PCC architecture determining a second group identifier associated with the subscriber associated with the user equipment;
    the policy controller in the PCC architecture, performing a selection between a first set of at least one content filtering rule related to the first group identifier associated with the subscriber and a second set of at least one content filtering rule related to the second group identifier associated with the subscriber, each of the first set of at least one content filtering rule and the second set of at least one content filtering rule configured to filter traffic at the content level; and
    the policy controller in the PCC architecture indicating, by assigning a content filtering identifier to the data traffic of the user equipment, a result of the selection to at least one node configured to perform, on the basis of the selected set of at least one content filtering rule, content filtering, at the content level, of data traffic of the user equipment.

2. The method of claim 1, further comprising:
    the policy controller in the PCC architecture indicating the result of the selection by providing the content filtering identifier to said at least one node, said content filtering identifier being usable by said at least one node to determine the selected set of at least one content filtering rule.

3. The method of claim 1, comprising:
    the policy controller in the PCC architecture indicating the result of the selection by providing the selected set of at least one content filtering rule to said at least one node.

4. The method of claim 1, wherein said selection is further based on subscriber profile data related to the subscriber, the subscriber profile data classifying the subscriber into a category of subscribers having the same content filtering requirements.

5. The method of claim 1, wherein the data traffic of the user equipment corresponds to data traffic of a service that includes a plurality of types of content, one of the plurality of types of content being filtered by the selected set of at least one content filtering rule while allowing the remaining types of content included in the service.

6. The method of claim 1, wherein the policy controller determines the first group identifier associated with the subscriber and the second group identifier associated with the subscriber in response to the user equipment connecting to the communication network.

7. A method of differentiating data traffic, at the content level, in a Policy and Charging Control (PCC) architecture in a communication network, the method comprising:
    a node of the communication network receiving, from a policy controller in the PCC architecture, an indication, the indication comprising a content filtering identifier assigned to the data traffic of the user equipment, of a result of a selection between a first set of at least one content filtering rule related to a first group identifier associated with a subscriber associated with a user equipment connected to the communication network and a second set of at least one content filtering rule related to a second group identifier associated with the subscriber associated with the user equipment connected to the communication network, each of the first set of at least one content filtering rule and the second set of at least one content filtering rule configured to filter data traffic of the user equipment at the content level, said second identifier of the subscriber associated with the user equipment being based on a location of the user equipment; and on the basis of the selected set of at least one content filtering rule, the node performing content filtering, at the content level, of data traffic of the user equipment.

8. The method of claim 7,
wherein the node determines the selected set of at least one content filtering rule from the content filtering identifier.

9. The method of claim 8, wherein said determining the selected set of at least one content filtering rule comprises:
the node sending a request including the content filtering identifier to a content filtering policy server; and
the node receiving a response to the request from the content filtering policy server, the response comprising at least a part of the selected set of at least one content filtering rule.

10. The method of claim 7, wherein the received indication comprises the selected set of at least one content filtering rule; and
the data traffic of the user equipment corresponding to data traffic of a service that includes a plurality of types of content, one of the plurality of types of content being filtered by the selected set of at least one content filtering rule while allowing the remaining types of content included in the service.

11. The method of claim 10, further comprising:
the node sending a request including a content identifier to a content filtering policy server;
the node receiving a response to the request from the content filtering policy server, the response indicating a type of content corresponding to said content identifier; and
wherein said content filtering performed by the node is further based on the indicated type of content.

12. The method of claim 7, further comprising:
the node sending a request including a content identifier to a content filtering policy server;
the node receiving a response to the request from the content filtering policy server, the response indicating a type of content corresponding to said content identifier; and
wherein said content filtering performed by the node is further based on the indicated type of content.

13. A policy controller in a Policy and Charging Control (PCC) architecture in a communication network, the policy controller comprising:
a processor configured to:
determine a first group identifier associated with a subscriber associated with a user equipment connected to the communication network;
on the basis of a location of the user equipment, determine a second group identifier associated with the subscriber associated with the user equipment;
perform a selection between a first set of at least one content filtering rule related to the first group identifier associated with the subscriber and a second set of at least one content filtering rule related to the second group identifier associated with the subscriber, each of the first set of at least one content filtering rule and the second set of at least one content filtering rule configured to filter traffic at the content level; and
an interface for indicating, by assigning a content filtering identifier to the data traffic of the user equipment, a result of the selection to at least one node configured to perform, on the basis of the selected set of at least one content filtering rule, content filtering, at the content level, of data traffic of the user equipment.

14. The policy controller of claim 13, wherein the policy controller is configured to:
indicate the result of the selection by providing the content filtering identifier to said at least one node, said content filtering identifier being usable by said at least one node to determine the selected set of at least one content filtering rule.

15. A node for a communication network, the node comprising:
an interface for receiving, from a policy controller in the in a Policy and Charging Control (PCC) architecture, an indication, the indication comprising a content filtering identifier assigned to the data traffic of the user equipment, of a result of a selection between a first set of at least one content filtering rule related to a first group identifier associated with a subscriber of a user equipment connected to the communication network and a second set of at least one content filtering rule related to a second group identifier associated with the subscriber of the user equipment connected to the communication network, each of the first set of at least one content filtering rule and the second set of at least one content filtering rule configured to filter traffic at the content level, said second group identifier of the subscriber associated with the user equipment being based on a location of the user equipment; and
a processor configured to perform, on the basis of the selected set of at least one content filtering rule, content filtering, at the content level, of data traffic of the user equipment.

16. The node of claim 15,
wherein the node determines the selected set of at least one content filtering rule from the content filtering identifier.

17. A system for differentiating data traffic in a communication network, the system comprising:
a policy controller in a Policy and Charging Control (PCC) architecture and at least one node, the policy controller including a processor that is configured to:
determine a first group identifier associated with a subscriber associated with a user equipment connected to the communication network, and
on the basis of a location of the user equipment, determine a second group identifier associated with the subscriber associated with the user equipment;
perform a selection between a first set of at least one content filtering rule related to the first group identifier associated with the subscriber and a second set of at least one content filtering rule related to the second group identifier associated with the subscriber, each of the first set of at least one content filtering rule and the second set of at least one content filtering rule configured to filter traffic at the content level; and indicate, by assigning a content filtering identifier to the data traffic of the user equipment, a result of the selection to the at least one node, and the at least one node being configured to perform, on the basis of the selected set of at least one content filtering rule, content filtering, at the content level, of data traffic of the user equipment.

18. The system of claim 17, wherein
the node is configured to receive, from the policy controller in the PCC architecture, an indication of a result of a selection between at least the first set of at least one content filtering rule related to the first group identifier associated with the subscriber associated with the user equipment connected to the communication network and the second set of at least one content filtering rule related to the second group identifier associated with the subscriber associated with the user equipment connected to the communication network.

19. A computer program product comprising a non-transitory computer readable medium storing computer readable program code that, when executed by a processor of a policy controller in a Policy and Charging Architecture (PCC) architecture of a communication network, causes the policy controller in the PCC architecture to:

determine a first group identifier associated with a subscriber associated with a user equipment connected to a communication network;

on the basis of a location of the user equipment, determine a second group identifier associated with the subscriber associated with the user equipment;

perform a selection between a first set of at least one content filtering rule related to the first group identifier associated with the subscriber and a second set of at least one content filtering rule related to the second group identifier associated with the subscriber, each of the first set of at least one content filtering rule and the second set of at least one content filtering rule configured to filter traffic at the content level; and indicate, by assigning a content filtering identifier to the data traffic of the user equipment, a result of the selection to at least one node configured to perform, on the basis of the selected set of at least one content filtering rule, content filtering, at the content level, of data traffic of the user equipment.

20. A computer program product comprising a non-transitory computer readable medium storing computer readable program code that, when executed by a processor of a node of a communication network, causes the node to:

receive, from a policy controller in a Policy and Charging Control (PCC) architecture, an indication, the indication comprising a content filtering identifier assigned to the data traffic of the user equipment, of a result of a selection between a first set of at least one content filtering rule related to a first group identifier associated with a subscriber associated with a user equipment connected to a communication network and a second set of at least one content filtering rule related to a second group identifier associated with the subscriber associated with the user equipment connected to a communication network, each of the first set of at least one content filtering rule and the second set of at least one content filtering rule configured to filter traffic at the content level, said second group identifier of the subscriber associated with the user equipment being based on a location of the user equipment; and on the basis of the selected set of at least one content filtering rule, perform content filtering, at the content level, of data traffic of the user equipment.

* * * * *